United States Patent [19]
Knutson et al.

[11] 3,740,626
[45] June 19, 1973

[54] ATMOSPHERIC CONTAMINANT COLLECTOR

[75] Inventors: Knut Raymond Knutson, Sundbyberg; Michele Morichetto, Ekero; P. Magnus Wannfors, Stenhamra, all of Sweden

[73] Assignee: Incentive Research & Development AB,, Bromma, Sweden

[22] Filed: Dec. 16, 1971

[21] Appl. No.: 208,739

[30] Foreign Application Priority Data
Dec. 23, 1970 Sweden.............................. 17532/70

[52] U.S. Cl................ 317/262 R, 73/23, 250/236, 250/237 R, 73/421
[51] Int. Cl. ............................................. G01n 31/00
[58] Field of Search ................... 73/23, 421, 425.2; 250/236, 237 R; 317/262 R

[56] References Cited
UNITED STATES PATENTS
| | | | |
|---|---|---|---|
| 2,699,679 | 1/1955 | Munger............................. | 73/425.2 |
| 3,299,700 | 1/1967 | Stout, Jr. .............................. | 73/170 |
| 2,391,601 | 12/1945 | Thomas et al............................ | 73/23 |
| 2,795,705 | 6/1957 | Rabinow............................. | 250/236 |
| 3,117,586 | 1/1964 | Cleaver.......................... | 317/DIG. 1 |
| 3,333,458 | 8/1967 | Heath et al. ............................ | 73/23 |
| 3,461,307 | 8/1969 | Rusling et al. .................. | 250/237 R |

Primary Examiner—L. T. Hix
Attorney—Robert J. Horn, Jr.

[57] ABSTRACT

A device for controlling the operation of an atmospheric contaminants collecting apparatus comprises means, which are responsive to the prevailing wind velocity at the site of the collecting apparatus and which generate a control signal maintaining the collecting apparatus in operation only when the prevailing wind velocity is on the one side of a predetermined limit value, that is exceeds or alternatively is less than this limit value. In a preferred embodiment the device comprises also means responsive to the prevailing wind direction for modifying or influencing the control signal to the contaminants collecting apparatus in such a manner that the collecting apparatus is maintained in operation only when the prevailing wind velocity is on the one side of the predetermined limit value and at the same time the prevailing wind direction lies within a predetermined sector angle.

5 Claims, 6 Drawing Figures

ATMOSPHERIC CONTAMINANT COLLECTOR

BACKGROUND OF THE INVENTION

The present invention relates to devices for collecting samples of contaminants in the atmosphere and in particular to a device for controlling the operation of atmospheric contaminant collectors.

It has lately become an increasingly important necessity to make it possible to determine the presence, the amount and the type of contaminants polluting the atmospheric air. Various apparatuses have been designed for collecting samples of atmospheric contaminants, which may be solid, gaseous or liquid. Such an atmospheric contaminant sample collector may in its most simple form comprise a motor-driven fan, which forces per unit of time a predetermined volume of the ambient atmospheric air through filter means, which retain any contaminants of the kind to be measured that may be present in the atmospheric air. Such a sample collector is also often provided with a time meter, which measures and records the total time of operation of the collector, that is the duration of the sample collecting period. In order to make it possible to segregate contaminants originating from local pollution sources close to the place where the contaminant collector is positioned from contaminants originating from more remote pollution sources and to determine from which pollution source or sources contaminants collected at a given place originate, it would be desirable to make the sample collecting process dependent upon the velocity and the direction of the wind at the site of collection. In order to be practically usable to any substantial extent such an atmospheric contaminant sample collector controlled by the velocity and the direction of the wind must have an automatic and reliable operation, be of a simple design and inexpensive to manufacture, be easily portable and have a low power consumption.

SUMMARY OF THE INVENTION

The object of the present invention is therefore to provide a simple and inexpensive, reliable and automatically operating device for controlling an atmospheric contaminant collecting apparatus as a function of the prevailing velocity and direction of the wind.

For this object the device according to the invention includes means responsive to the prevailing wind velocity for generating a control signal for an atmospheric contaminants collection apparatus when the wind velocity is on the one side of a predetermined limit value. These wind velocity responsive means include a wind motor; a first rotatable optical polarizing disc coupled to said wind motor so as to be rotated thereby; an electric motor driven with a predetermined constant velocity corresponding to said limit value for the wind velocity; a second rotatable optical polarizing disc coupled to said electric motor so as to be driven therefrom; one of said polarizing discs being rigidly coupled to its associated drive motor and the other polarizing disc being coupled to its associated drive motor through a slip coupling, and said first and second polarizing discs being mounted coaxially and coupled to each other by coupling means permitting such a mutual relative rotation through an angle of 90° between said first and second polarizing discs that the polarizing planes of the discs coincide in the one end position and are mutually perpendicular in the opposite end position for the relative angular rotation of the discs; and a light source and a photodetector stationarily mounted opposite each other of opposite sides of said first and second polarizing discs so that light emitted from said light source may reach said photodetector through said first and second polarizing discs. The output signal of the photodetector is used as a control signal for the operation of the contaminants collecting apparatus.

BRIEF DESCRIPTION OF THE DRAWINGS

The invention and additional advantageous features thereof will be described more in detail in the following with reference to the accompanying drawings, which show by way of example an embodiment of the invention. In the drawings

DESCRIPTION OF THE PREFERRED EMBODIMENTS

Figure 1:
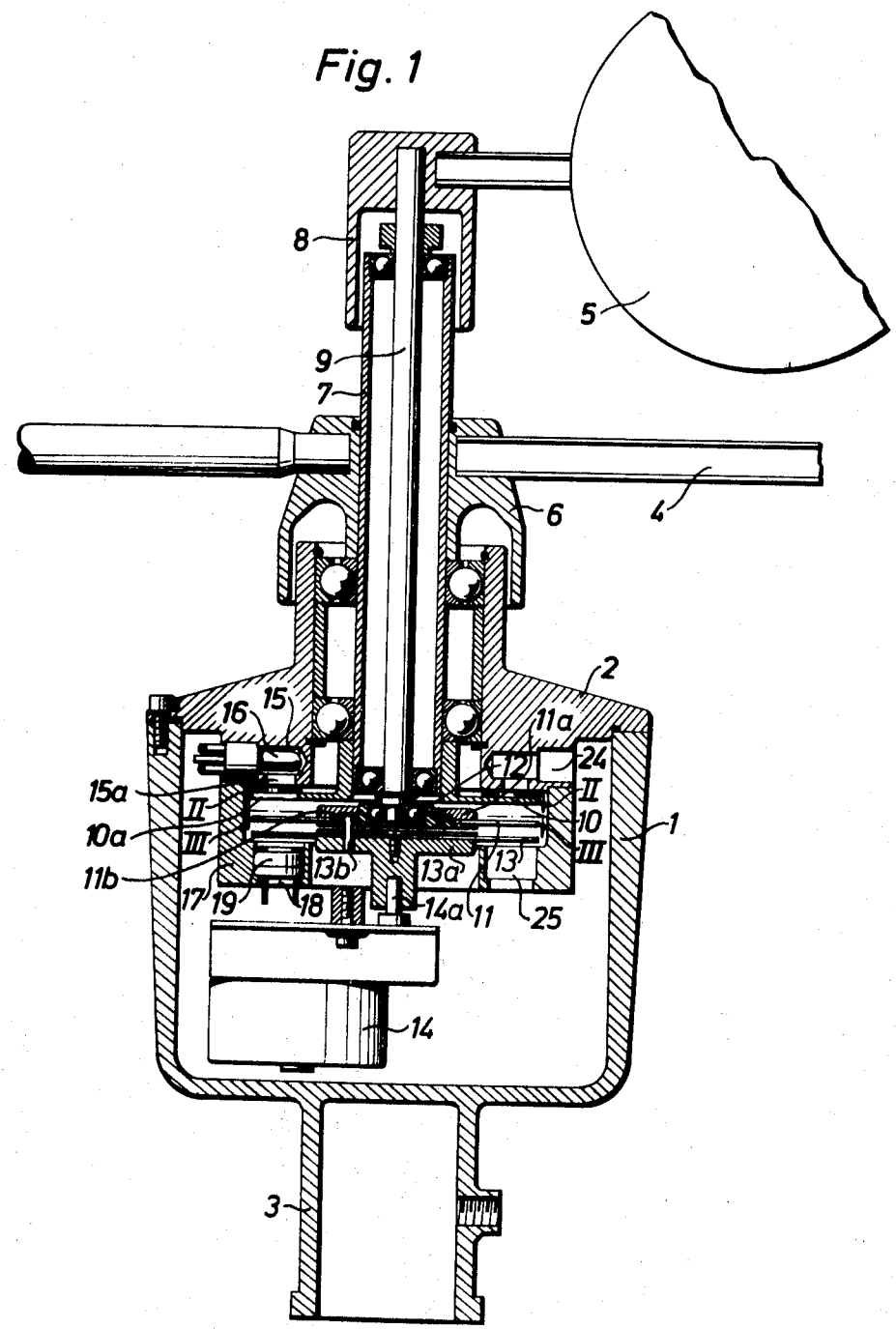
FIG. 1 is a vertical cross-sectional view of a first embodiment of a device according to the invention.
Figure 2:
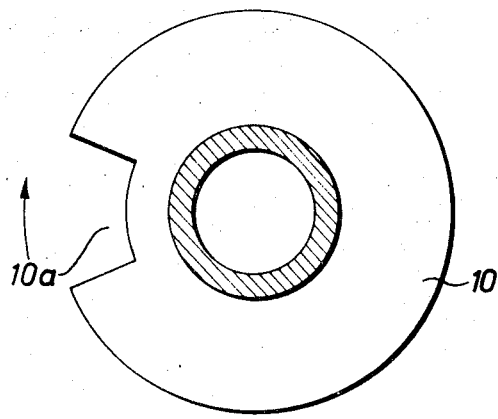
FIG. 2 shows a sector disc in the device illustrated in FIG. 1 as seen along the line II—II in FIG. 1.

The device according to the invention illustrated in FIGS. 1 to 5 comprises, as most readily seen in FIG. 1, a housing 1 closed with a cover 2 and provided at its lower end with a suitable socket 3 for the mounting of the device on for instance a support column or a similar arrangement. The device comprises further a wind-vane 4, shown only partially, and a wind motor in the form of an anemometer wheel 5, also shown partially. The wind-vane 4 is mounted by means of a hub 6 on a tubular shaft 7 journalled for rotation in the cover 2. The anemometer wheel 5 is mounted by means of a hub 8 on a shaft 9, which is journalled for rotation within the tubular shaft 7.

A sector disc 10 is attached to the lower end of the tubular shaft 7 supporting the wind-vane 4. As most readily seen in FIG. 2, the sector disc 10 is provided with a sector-shaped notch 10a along its outer edge. In the illustrated embodiment of the invention this sector-shaped notch 10a corresponds to an sector angle of 45°.

The lower end of the shaft 9 supporting the anemometer wheel 5 is coupled to a first optical polarizing disc 11 through slip coupling means, which in the illustrated embodiment of the invention consist of a ball bearing 12. A second optical polarizing disc 13 is located coaxially underneath the polaroid disc 11 and is rigidly coupled to the shaft 14a of an electric motor 14 mounted in the housing 1. The hub 11a of the first polaroid disc 11 is provided with a groove 11b shaped as a circular arc with a length corresponding to a sector angle of 90°, as can be most readily seen in FIGS. 3 and 4. The hub 13a of the second polaroid disc 13 is provided with a pin 13b projecting into the groove 11b in the hub 11a of the first polaroid disc 11. Consequently, the two polaroid discs 11 and 13 can be rotated relative each other only through an angle of 90°. The groove 11b and the pin 13b have such relative positions that the two polaroid discs 11 and 13 have their planes of polarization coinciding at the one end of their mutual relative angular rotation, as illustrated in FIG. 3, whereas at the opposite end of their relative mutual angular rotation their planes of polarization are perpendicular, as illustrated in FIG. 4.

Figure 3:
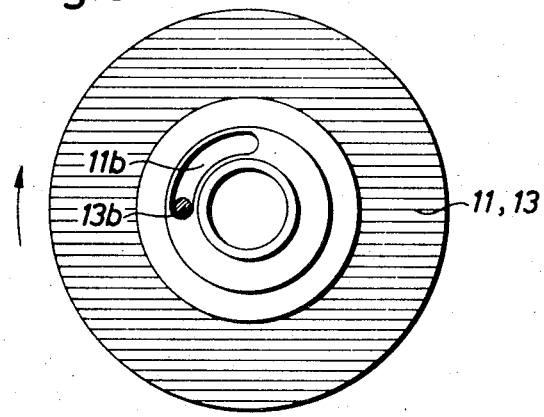
FIG. 3 illustrates two polaroid discs in the device shown in FIG. 1 as seen along the line III—III in FIG. 1 polaroid with the polaroid discs in a first relative position.
Figure 4:
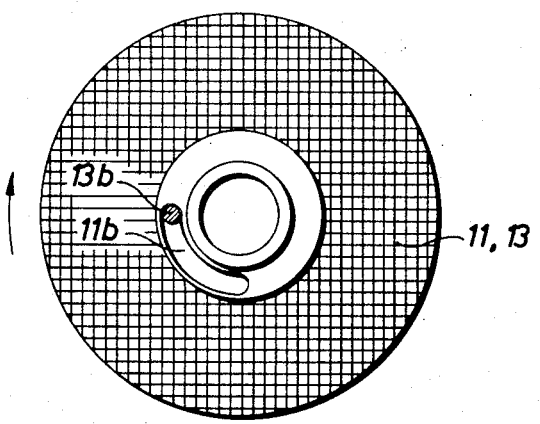
FIG. 4 is a view similar to that in FIG. 3 but with the polaroid discs shown in a second relative position.
Figure 6:
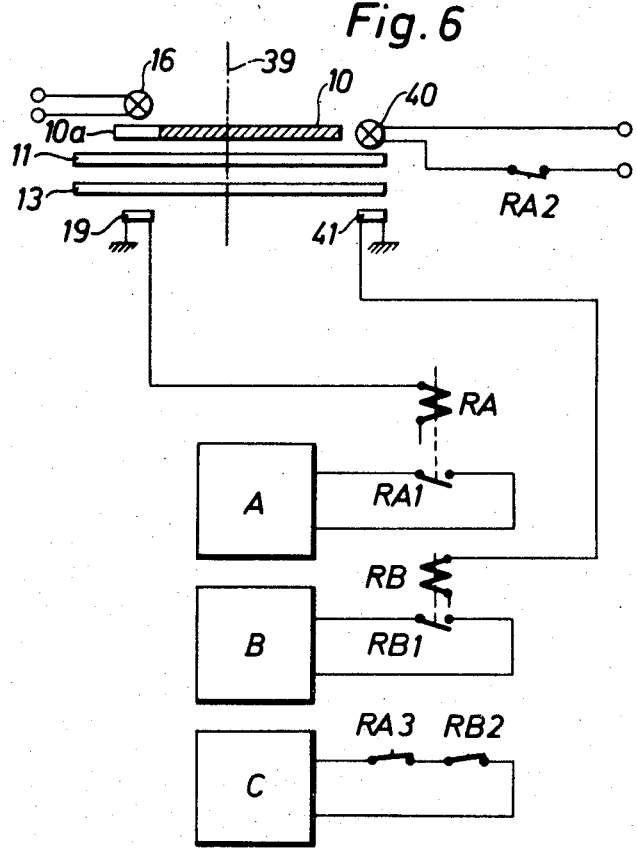
FIG. 6 illustrates schematically an embodiment of a device according to the invention for controlling simultaneously a plurality of atmospheric contaminants sample collectors.

The polaroid discs 11 and 13 are rotated by the wind motor 5 and the electric motor 14, respectively, in the same direction indicated by an arrow in FIGS. 3 and 4. It is appreciated that as long as the anemometer wheel 5 is rotating at a rate lower than the rate of rotation of the shaft 14a of the electric motor 14, the two polaroid discs 11 and 13 will be in the mutual relative positions illustrated in FIG. 4, in which their polarization planes are perpendicular, wherefore no light can pass through the discs. If on the other hand the rate of rotation of the anemometer wheel 5 exceeds the rate of rotation of the shaft 14a of the electric motor, the polaroid discs 11 and 13 will instead assume the relative mutual positions illustrated in FIG. 3, in which their polarization planes coincide so that light can pass through the discs.

A lamp 16 is mounted in a bore 15 in the cover 2 and emits light towards the upper side of the sector disc 10 through an opening 15a in the wall of the bore 15. A mounting ring 17 attached to the lower side of the cover 2 is provided with a bore 18, which is located opposite to the bore 15 in the cover 2 housing the lamp 16 and in which a photocell or any other suitable photodetector 19 is mounted.

It is appreciated that the light from the lamp 16 can reach and affect the photodetector 19 only if the windvane coupled to the sector disc 10 is in such a position that the light emitted from the lamp 16 can pass through the notch 10a in the sector disc 10 and at the same time the anemometer wheel 15 is driven by the wind so as to rotate at a rate exceeding the rate of rotation of the electric motor 14. Consequently, the photodetector 19 generates an output signal only when the prevailing wind direction lies within a given sector determined by the position of the sector disc 10 relative the lamp 16 and at the same time the prevailing wind velocity exceeds a given limit value determined by the rate of rotation of the electric motor 14.

It is appreciated that alternatively the two polaroid discs can be arranged in such a manner relative each other that their polarization planes are mutually perpendicular when the rate of rotation of the anemometer wheel exceeds the rate of rotation of the electric motor and coincide when the rate of rotation of the anemometer wheel is less than the rate of rotation of the electric motor. In such a case an output signal will be generated by the photodetector 19 only when the prevailing wind direction lies within the sector angle determined by the sector disc 10 and at the same time the prevailing wind velocity is below the limit value determined by the rate of rotation of the electric motor 14.

Figure 5:
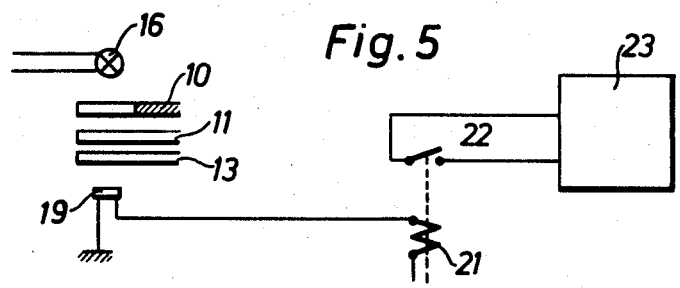
FIG. 5 shows schematically an electric circuit diagram for the device according to the invention illustrated in FIGS. 1 to 4 and for an atmospheric contaminants sample collector controlled therefrom.

As illustrated in the circuit diagram in FIG. 5, the output signal from the photodetector 19 can be used, if necessary after amplification, for energizing a relay 21 for instance, which in its on-position closes a starting switch 22 for an atmospheric contaminants sample collector 23 of the type mentioned in the foregoing, which collects the contaminants present in the ambient atmosphere and preferably also records its total operation time.

It is appreciated that the magnitude of the sector angle, within which a wind direction activating the contaminants collecting process must lie, can be changed by variation of the circumferential length of the notch 10*a* in the edge of the sector disc 10. The mid-direction of this sector angle, within which the contaminants collecting apparatus is kept in operation can be changed by rotation of the housing 1 of the device to new position or by moving the lamp 16 and the photodetector 19 to another pair of associated bores 24 and 25, respectively, in the cover 2 and the mounting ring 17, respectively. Therefore, the device is preferably provided with several such pairs of associated bores for the lamp 16 and the photodetector 19, respectively, evenly spaced about the axis of symmetry of the device. By mounting lamps and photodetectors, respectively, in several of these pairs of associated bores several separate contaminants collecting apparatuses may be controlled simultaneously from the device according to the invention, in which case these contaminants collectors will be put into operation for different wind directions.

It is also appreciated that the limit value for the wind velocity, at which the device according to the invention activates the contaminants collecting apparatus, can be changed by variation of the rate of rotation of the electric motor 14.

FIG. 6 shows schematically, how a device according to the invention can be used for controlling the operation of several contaminants ample collectors in such a manner that these will operate for different wind directions and/or different wind velocities. It is assumed that the control device according to the invention is of the type described in the foregoing and illustrated in FIGS. 1 to 4, wherefore for the sake of simplicity only the sector disc 10, the two polaroid discs 11 and 13, the lamp 16 and the photodetector 19 are shown in FIG. 6. The common axis of rotation for the sector disc 10 and the polaroid discs 11 and 13 is designated with 39.

In the same way as described in the foregoing in connection with FIG. 5 the output signal of the photodetector 19 is used for energizing a relay RA, which in its on-position closes a make contact RA1 inserted in the starting circuit for a first contaminants sample collector A. Consequently, the sample collector A will be kept in operation as long as the wind direction lies within the sector angle determined by the notch 10*a* in the sector disc 10 and at the same time the wind velocity exceeds a predetermined limit value, which is determined by the rate of rotation of the polaroid disc 13.

Contrary to the device according to the invention described in the foregoing and illustrated in FIGS. 1 to 5, the polaroid discs 11 and 13 in the device illustrated in FIG. 6 have a somewhat larger diameter than the sector disc 10. Further, an additional lamp 40 and an associated additional photodetector 41 are disposed opposite each other on opposite sides of the polaroid discs 11 and 13 in such a manner that the light emitted by the lamp 40 may reach the photodetector 41 through the polaroid discs 11 and 13 without being affected by the sector disc 10. The power supply circuit for the lamp 4 includes a break contact RA2 on the relay RA. Consequently, the lamp 40 is turned on only when the relay RA is in its off-position, that is only when the wind direction does not lie within the sector angle determined by the notch 10a in the sector disc 10. Consequently the photodetector 41 produces an output signal only when the wind velocity exceeds the limit value determined by the rate of rotation of the polaroid disc 13 and at the same time the prevailing wind direction lies outside the sector angle which gives cause to an output signal from the photodetector 19 and thus to an activation of the sample collector A. Thu output signal of the photodetector 41 is used for energizing a second relay RB, which closes a make contact RB1 inserted in the starting circuit for a second contaminants sample collector B. Consequently, the sample collector B is kept in operation, when the wind velocity exceeds the limit value mentioned in the foregoing and at the same time the wind direction lies outside the sector angle determined by the notch 10a in the sector disc 10.

Further, a third contaminants sample collector C is provided, which has a starting circuit including a break contact RA3 on the relay RA in series with a break contact RB2 on the relay RB. Consequently, operation of the sample collector C is initiated as soon as neither of the sample collectors A and B is in operation. It is appreciated that this means that the sample collector C is operating, when the wind velocity is lower than the limit value mentioned in the foregoing independently of the prevailing wind direction.

We claim:

1. A device for controlling the operation of an atmospheric contaminants collecting apparatus, comprising means responsive to the prevailing wind velocity for generating a control signal for said collecting apparatus when the wind velocity is on the one side of a predetermined limit value, wherein said wind velocity responsive means comprise a wind motor, a first rotatable optical polaroid disc coupled to said wind motor so as to be rotated thereby, an electric motor driven with a predetermined constant rate of rotation corresponding to said limit value for the wind velocity, a second rotatable optical polaroid disc coupled to said electric motor so as to be rotated thereby, one of said first and second polaroid discs being rigidly coupled to its associated drive motor and the other polaroid disc being coupled to its associated drive motor through slip coupling means, and said first and second polaroid discs being mounted coaxially relative each other and coupled to each other through coupling means permitting such a mutual relative rotation through an angle of 90° between said first and second polaroid discs that the polarizing planes of the polaroid discs coincide in the one end position and are mutually perpendicular in the opposite end position for the relative angular rotation of the polaroid discs, and a lamp and a photodetector mounted stationarily opposite each other on opposite sides of said first and second polaroid discs so that light emitted by said lamp may reach said photodetector through said polaroid discs, and the output signal of said photodetector being used as said control signal for said atmospheric contaminants collecting apparatus.

2. A device as claimed in claim 1, wherein said slip coupling means is arranged between said wind motor and said first polaroid disc.

3. A device as claimed in claim 1, comprising means responsive to the prevailing wind direction for influencing the light emission from said lamp so that said photodetector can be affected by light emitted from said lamp only when the prevailing wind direction lies within a predetermined sector angle.

4. A device as claimed in claim 3, wherein said wind direction responsive means include a rotatable wind-vane, a rotatable disc coupled to said wind-vane so as to be rotated thereby, said disc having a light-pervious portion with a circumferential length corresponding to said sector angle and being mounted coaxially relative said first and second polaroid discs between said lamp and said photodetector so that light emitted by said lamp can reach said photodetector only through said light pervious portion of said disc.

5. A device as claimed in claim 4, comprising several associated pairs of a lamp mounted on the one side of said discs and a photodetector mounted on the opposite side of said discs, said associated pairs of a lamp and photodetector being located in different circumferentially spaced positions about said discs.

* * * * *